(12) United States Patent
Tsai

(10) Patent No.: US 7,845,793 B1
(45) Date of Patent: Dec. 7, 2010

(54) EYEGLASS TEMPLE HAVING AN ADJUSTABLE LENGTH AND EYEGLASSES INCLUDING THE EYEGLASS TEMPLE

(76) Inventor: Tsung-Meng Tsai, No. 68, Lane 251, Dong-an Rd., Tainan City (TW)

( * ) Notice: Subject to any disclaimer, the term of this patent is extended or adjusted under 35 U.S.C. 154(b) by 0 days.

(21) Appl. No.: 12/658,358

(22) Filed: Feb. 5, 2010

(30) Foreign Application Priority Data

Jul. 6, 2009 (TW) ............................... 98212220 U

(51) Int. Cl.
*G02C 5/20* (2006.01)
(52) U.S. Cl. ...................................... 351/118; 351/119
(58) Field of Classification Search .................... 351/41, 351/111, 118, 119, 121
See application file for complete search history.

(56) References Cited

U.S. PATENT DOCUMENTS 4,946,268 A * 8/1990 Nowottny et al. ........... 351/118

7,396,125 B1 * 7/2008 Tang ........................... 351/120

* cited by examiner

*Primary Examiner*—Huy K Mai
(74) *Attorney, Agent, or Firm*—Ohlandt, Greeley, Ruggiero & Perle, LLP

(57) ABSTRACT

An eyeglass temple includes a temple body, an insert, and a fixing component. The temple body has a groove-forming portion, and a branch portion connected to a rear portion of the groove-forming portion. The groove-forming portion has a sleeving wall defining a sleeving space extending in a lengthwise direction of the temple body. The sleeving wall has a hole communicating with the sleeving space. The insert has an arm portion inserted into the sleeving space and movable back and forth therein, and a hinge portion connected to a front portion of the arm portion. The arm portion has an adjusting hole. The adjusting hole has at least two positioning hole portions spaced apart from each other in a lengthwise direction of the arm portion, and a reduced hole portion disposed between and interconnecting the positioning hole portions. The fixing component includes a pillar.

10 Claims, 4 Drawing Sheets

EYEGLASS TEMPLE HAVING AN ADJUSTABLE LENGTH AND EYEGLASSES INCLUDING THE EYEGLASS TEMPLE

CROSS-REFERENCE TO RELATED APPLICATION

This application claims priority of Taiwanese Application No. 098212220, filed on Jul. 6, 2009.

BACKGROUND OF THE INVENTION

1. Field of the Invention

The present invention relates to an eyeglass temple, more particularly to an eyeglass temple having an adjustable length. The present invention also relates to eyeglasses including the eyeglass temple which is mounted to an end piece of a frame front thereof.

2. Description of the Related Art

A conventional eyeglass frame uses an eyeglass temple having a fixed length. The eyeglass temple is mounted to an end piece of a frame front of the conventional eyeglass frame. However, the distance between the nose and any ear of each user may be different, such that if the length of each eyeglass temple is not appropriate for a particular wearer, the resulting pair of eyeglasses may be uncomfortable.

Accordingly, eyeglass temples having adjustable lengths have been proposed. However, these eyeglass temples have exposed adjusting holes, which not only negatively affects the aesthetics of eyeglasses, but also, the wearer's hair may get caught in such exposed adjusting holes. Therefore, in order to overcome such drawbacks, there is a need for a new eyeglass temple structure.

SUMMARY OF THE INVENTION

Therefore, the object of the present invention is to provide an eyeglass temple and eyeglasses including the eyeglass temple, in which the eyeglass temple can be adjusted in length, is aesthetically pleasing, and does not pose safety risks to the wearer during adjustment thereof.

According to one aspect, the eyeglass temple of the present invention comprises a temple body, an insert, and a fixing component.

The temple body has a groove-forming portion, and a branch portion connected to a rear portion of the groove-forming portion. The groove-forming portion has a sleeving wall defining a sleeving space extending in a lengthwise direction of the temple body. The sleeving wall has a hole communicating with the sleeving space.

The insert has an arm portion inserted into the sleeving space and movable back and forth therein, and a hinge portion connected to a front portion of the arm portion. The arm portion has an adjusting hole, which is disposed fully in the sleeving space when the eyeglass temple is adjusted. The adjusting hole has at least two positioning hole portions spaced apart from each other in a lengthwise direction of the arm portion, and a reduced hole portion disposed between and interconnecting the positioning hole portions.

The fixing component includes a pillar extending through the hole of the sleeving wall and positioned in one of the positioning hole portions of the adjusting hole. The pillar is moveable through the reduced hole portion of the adjusting hole so as to be disposed in the other one of the positioning hole portions.

According to another aspect of the present invention, the eyeglasses comprise a frame front and a pair of eyeglass temples. The frame front includes a pair of end pieces. Each of the eyeglass temples includes a temple body, an insert, and a fixing component.

The temple body has a groove-forming portion, and a branch portion connected to a rear portion of the groove-forming portion. The groove-forming portion has a sleeving wall defining a sleeving space extending in a lengthwise direction of the temple body. The sleeving wall has a hole communicating with the sleeving space.

The insert has an arm portion inserted into the sleeving space and movable back and forth therein, and a hinge portion connected to a front portion of the arm portion and connected to a respective one of the end pieces of the frame front. The arm portion has an adjusting hole, which is disposed fully in the sleeving space when the eyeglass temple is adjusted. The adjusting hole has at least two positioning hole portions spaced apart from each other in a lengthwise direction of the arm portion, and a reduced hole portion disposed between and interconnecting the positioning hole portions.

The fixing component includes a pillar extending through the hole of the sleeving wall and positioned in one of the positioning hole portions of the adjusting hole. The pillar is moveable through the reduced hole portion of the adjusting hole so as to be disposed in the other one of the positioning hole portions.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
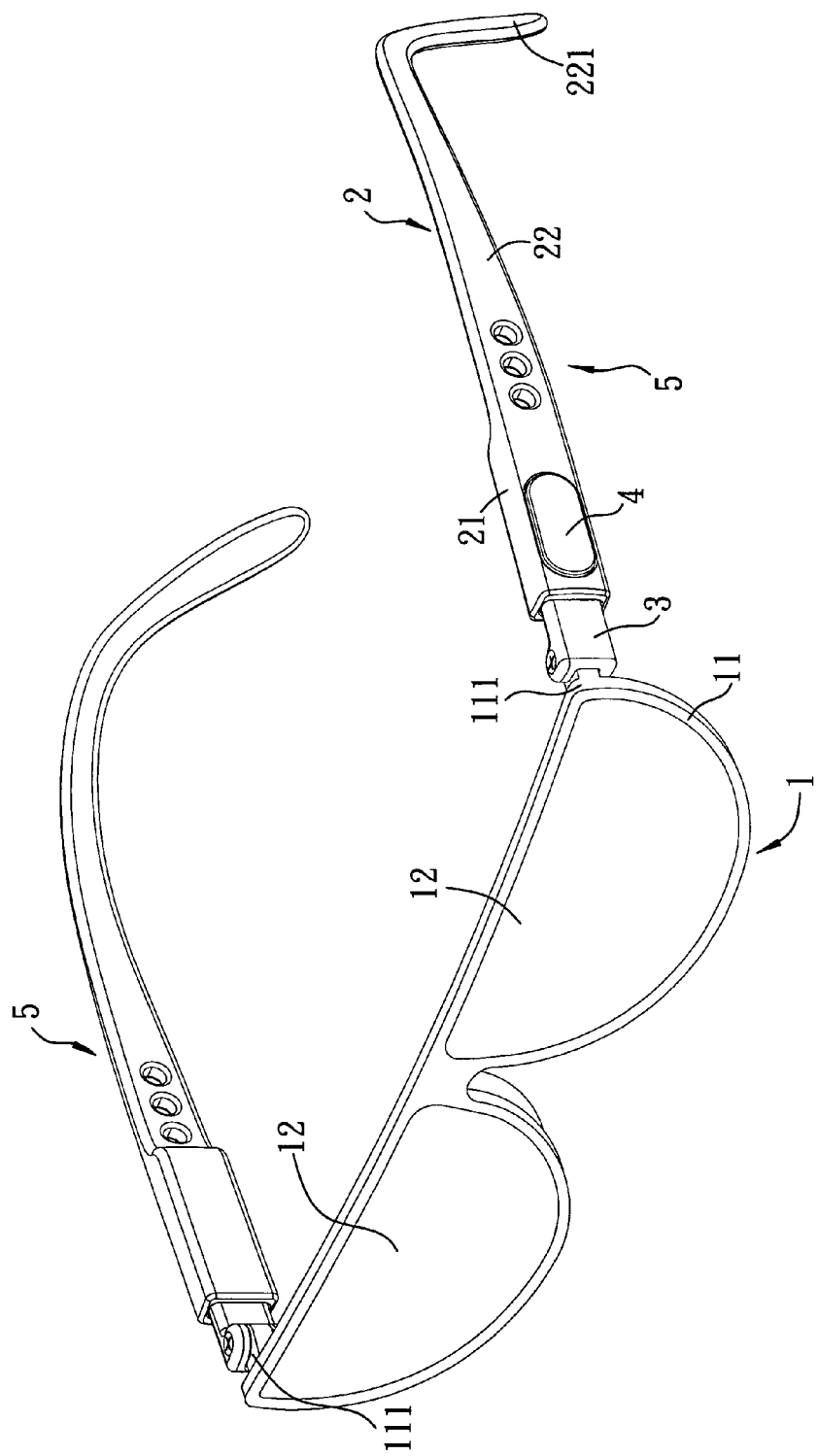
FIG. 2 is a perspective view of eyeglasses according to a preferred embodiment of the present invention.

Referring to FIG. 2, eyeglasses according to a preferred embodiment of the present invention comprises a frame front 11 including a pair of end pieces 111, a pair of eyeglass temples 5, and a lens unit 1 including two lenses 12.

Figure 1:
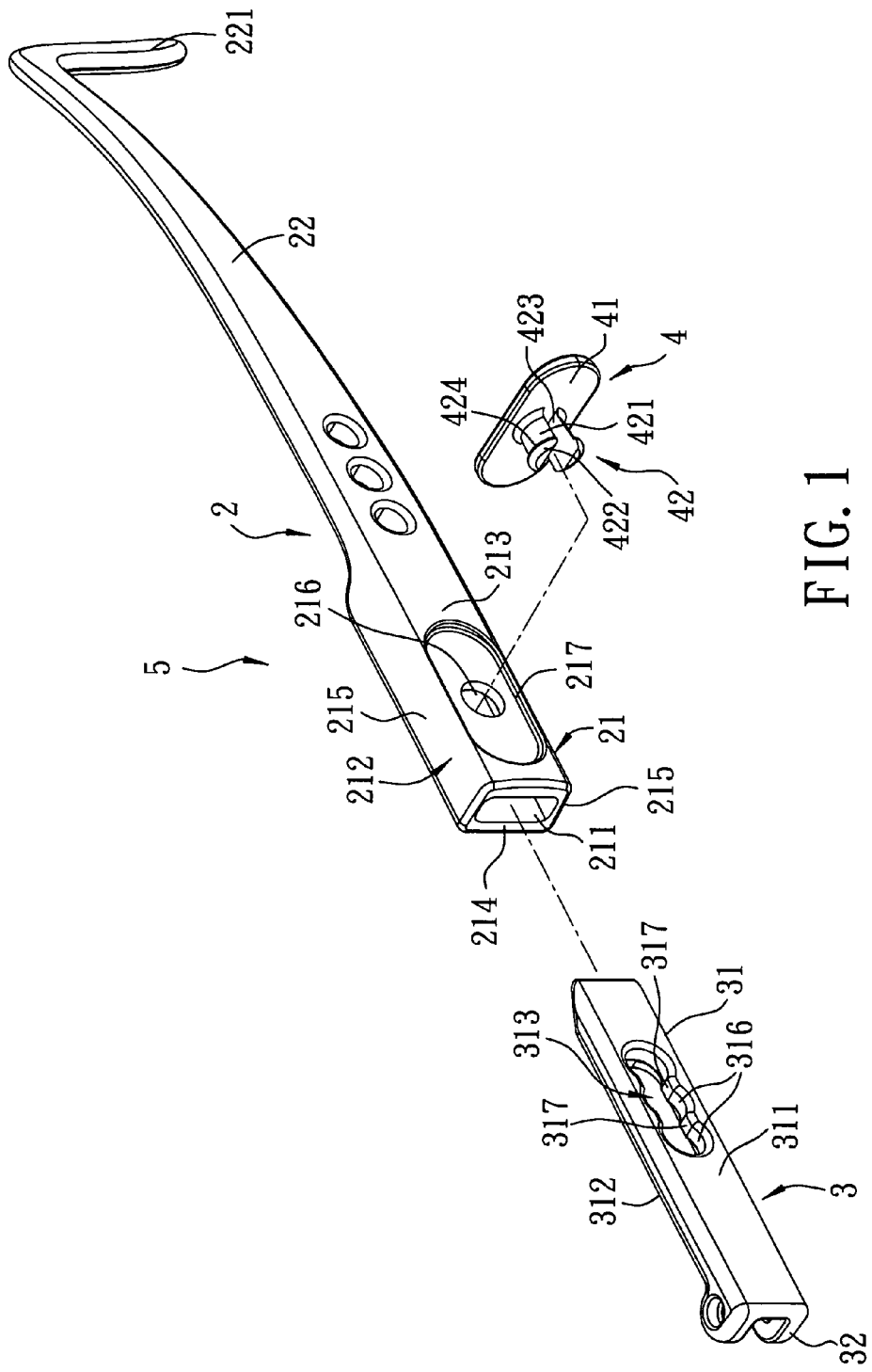
FIG. 1 is an exploded perspective view of an eyeglass temple according to a preferred embodiment of the present invention.
Figure 3:
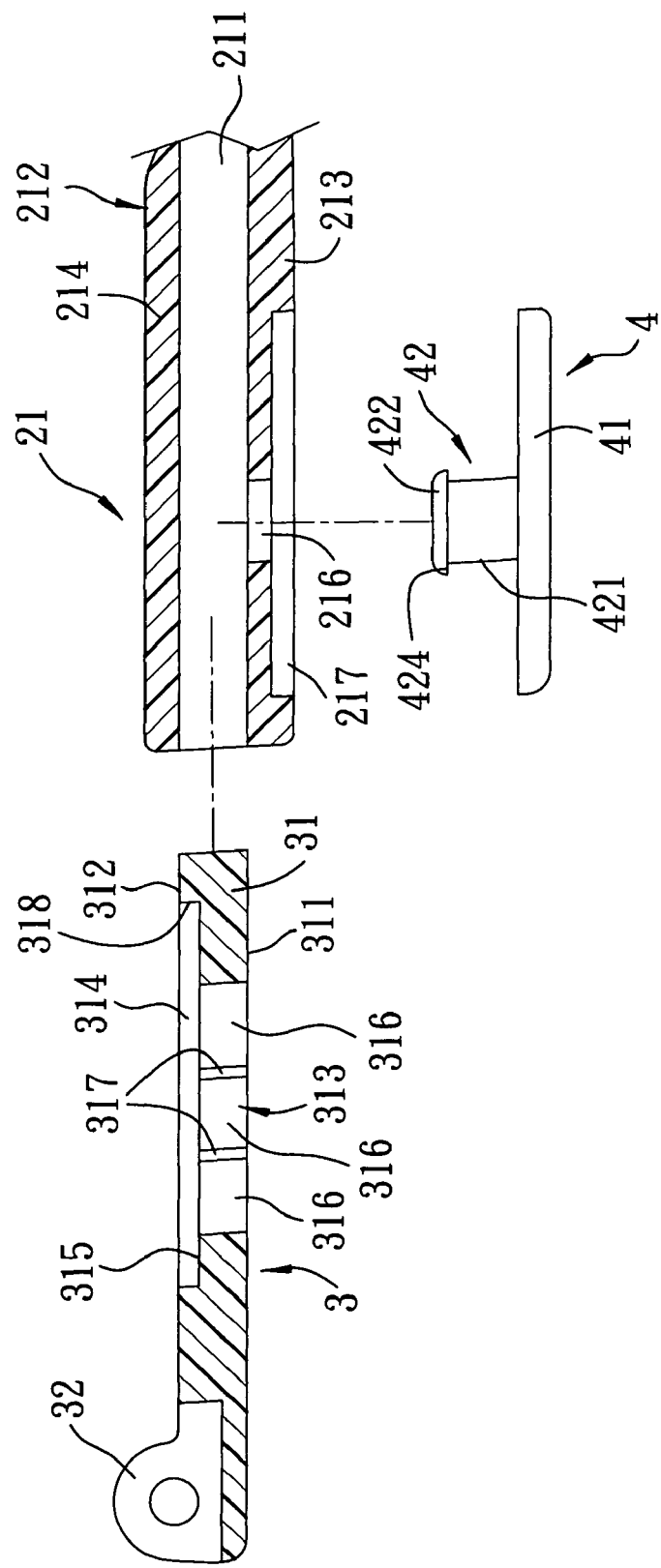
FIG. 3 is an exploded fragmentary sectional view of the eyeglass temple of the preferred embodiment.

Referring to FIGS. 1, 2, and 3, a preferred embodiment of the eyeglass temple 5 according to the present invention is shown to comprise a temple body 2, an insert 3, and a fixing component 4.

The temple body 2 has a groove-forming portion 21, and a branch portion 22 connected to a rear portion of the groove-forming portion 21. The groove-forming portion 21 has a sleeving wall 212 that defines a sleeving space 211 extending in a lengthwise direction of the temple body 2. The sleeving wall 212 has a hole 216 communicating with the sleeving space 211. The sleeving wall 212 of the groove-forming portion 21 of the temple body 2 has an outer wall 213 formed with the hole 216, an inner wall 214 opposing and spaced apart from the outer wall 213, and two side walls 215, each interconnecting the outer wall 213 and the inner wall 214. The outer wall 213 has an elliptic indentation 217 communicating with the hole 216. The branch portion 22 further has a hanger portion 221 which is placed around the ear of a wearer.

The insert 3 has an arm portion 31 inserted into the sleeving space 211 and movable back and forth therein, and a hinge portion 32 connected to a front portion of the arm portion 31 and pivotally connected to a respective one of the end pieces 111 of the frame front 11 using, for example, a screw. The arm portion 31 has an outer wall surface 311, an inner wall surface 312 opposite the outer wall surface 311 and formed with a depression 314, and an adjusting hole 313 extending through the outer wall surface 311 and the inner wall surface 312. The depression 314 is defined by a lateral wall 318, and a bottom wall 315 surrounding a periphery of the adjusting hole 313, and communicating with the adjusting hole 313. The adjusting hole 313 has at least two positioning hole portions 316 spaced apart from each other in a lengthwise direction of the arm portion 31, and at least one reduced hole portion 317 disposed between the positioning hole portions 316. In this embodiment, the adjusting hole 313 has first, second, and third positioning hole portions 316, a first reduced hole portion 317 disposed between the first and second positioning hole portions 316, and a second reduced hole portion 317 disposed between the second and third positioning hole portions 316.

The fixing component 4 includes a pillar 42 and a positioning plate 41 on which the pillar 42 is disposed and which is received at least partially within the indentation 217 of the outer wall 213 of the temple body 2. The pillar 42 extends through the hole 216 of the sleeving wall 212 and is positioned in one of the positioning hole portions 316 of the adjusting hole 313. The pillar 42 is moveable through said at least one of the reduced hole portions 317 of the adjusting hole 313 so as to be disposed in another one of the positioning hole portions 316.

The pillar 42 of the fixing component 4 has a pillar body 421, an engaging portion 422, and a groove 423. The pillar body 421 is formed on the positioning plate 41 and is disposed in the adjusting hole 313. The engaging portion 422 is formed on a rear portion of the pillar body 421 and is disposed in the depression 314. The groove 423 extends through the pillar body 421 and the engaging portion 422, such that the pillar 42 can be reduced in size while being moved through said at least one of the reduced hole portions 317, and can undergo elastic restoration when disposed in one of the positioning hole portions 316. The engaging portion 422 has an engaging edge 424 adjacent to the pillar body 421, and the engaging edge 424 abuts against the bottom wall 315 of the depression 314. Also, a diameter of the pillar body 421 of the pillar 42 is greater than a height of the reduced hole portion 317 of the adjusting hole 313, and may substantially correspond to a height of each of the positioning hole portions 316 of the adjusting hole 313.

Assembly of the eyeglass assembly will now be described with reference to FIGS. 1, 3, and 4. First, the arm portion 31 of the insert 3 is inserted into the sleeving space 211 of the temple body 2. Then, one of the positioning hole portions 316 of the insert 3 is placed opposing the hole 216 of the temple body 2, after which the pillar 42 of the fixing component 4 is inserted into the hole 216 of the temple body 2 and said one of the positioning hole portions 316. When the engaging edge 424 of the pillar 42 extends through the bottom wall 315 of the insert 3, the pillar 42 restores elastically and the engaging edge 424 of the pillar 42 abuts against the bottom wall 315 of the insert 3, thereby finishing assembly.

Figure 4:
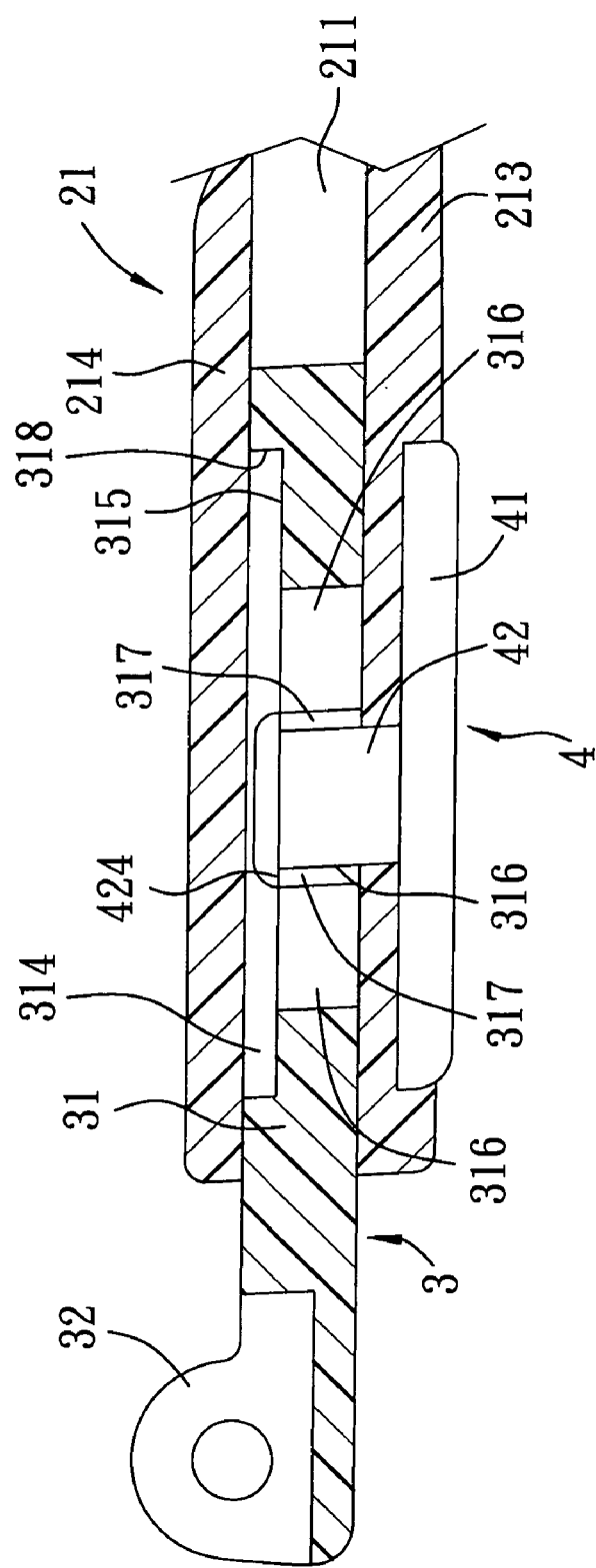
FIG. 4 is a fragmentary sectional view of the eyeglass temple of the preferred embodiment.

Referring to FIGS. 1, 3, and 4, to adjust the eyeglass temple 5, the insert 3 is held, and then the temple body 2 is pulled forwardly or backwardly relative to the insert 3, such that the fixing component 4 is placed in a different one of the positioning hole portions 316. The length of the eyeglass temple 5 increases when the fixing component 4 is moved to a rearwardly placed positioning hole portion 316, whereas the length of the eyeglass temple 5 decreases when the fixing component 4 is moved to a frontwardly placed positioning hole portion 316.

In some embodiments, the elliptic indentation 217 and the hole 216 of the sleeving wall 212 are formed respectively on and in the inner wall 214 of the sleeving wall 212.

It is noted that the adjusting hole 313 of the arm portion 31 is disposed fully in the sleeving space 211 when the eyeglass temple 5 is adjusted. Hence, the adjusting hole 313 is not exposed at any time, including even when the temple body 2 is adjusted, so that hair is not caught therein. Therefore, the eyeglass temple 5 of the present invention is safe and aesthetically pleasing while allowing for adjustments in the length thereof.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An eyeglass temple comprising:

a temple body having a groove-forming portion, and a branch portion connected to a rear portion of said groove-forming portion, said groove-forming portion having a sleeving wall defining a sleeving space extending in a lengthwise direction of said temple body, said sleeving wall having a hole communicating with said sleeving space;

an insert having an arm portion inserted into said sleeving space and movable back and forth therein, and a hinge portion connected to a front portion of said arm portion, said arm portion having an adjusting hole, which is disposed fully in said sleeving space when said eyeglass temple is adjusted, said adjusting hole having at least two positioning hole portions spaced apart from each other in a lengthwise direction of said arm portion, and at least one reduced hole portion disposed between said positioning hole portions; and a fixing component including a pillar extending through said hole of said sleeving wall and positioned in one of said positioning hole portions of said adjusting hole, said pillar being moveable through said reduced hole portion of said adjusting hole so as to be disposed in the other one of said positioning hole portions.

2. The temple as claimed in claim 1, wherein:

said sleeving wall of said temple body has an outer wall formed with said hole, an inner wall opposing and spaced apart from said outer wall, and two side walls, each interconnecting said outer wall and said inner wall, said outer wall having an indentation communicating with said hole; and said fixing component includes a positioning plate on which said pillar is disposed and which is received at least partially within said indentation.

3. The temple as claimed in claim 1, wherein:

said arm portion has an outer wall surface, and an inner wall surface opposite said outer wall surface and formed with a depression, said depression being defined by a lateral wall, and a bottom wall surrounding a periphery of said adjusting hole;

said pillar of said fixing component has a pillar body disposed in said adjusting hole, and an engaging portion disposed in said depression, said engaging portion having an engaging edge abutting against said bottom wall of said depression.

4. The temple as claimed in claim 3, wherein said pillar has a groove extending through said pillar body and said engaging portion.

5. The temple as claimed in claim 4, wherein:
said sleeving wall of said temple body has an outer wall formed with said hole, an inner wall opposing and spaced apart from said outer wall, and two side walls, each interconnecting said outer wall and said inner wall, said outer wall having an indentation communicating with said hole; and
said fixing component includes a positioning plate on which said pillar is disposed and which is received at least partially within said indentation.

6. Eyeglasses comprising:
a frame front including a pair of end pieces; and
a pair of eyeglass temples, each of said eyeglass temples including
a temple body having a groove-forming portion, and a branch portion connected to a rear portion of said groove-forming portion, said groove-forming portion having a sleeving wall defining a sleeving space extending in a lengthwise direction of said temple body, said sleeving wall having a hole communicating with said sleeving space;
an insert having an arm portion inserted into said sleeving space and movable back and forth therein, and a hinge portion connected to a front portion of said arm portion and connected to a respective one of said end pieces of said frame front, said arm portion having an adjusting hole, which is disposed fully in said sleeving space when said eyeglass temple is adjusted, said adjusting hole having at least two positioning hole portions spaced apart from each other in a lengthwise direction of said arm portion, and at least one reduced hole portion disposed between said positioning hole portions; and
a fixing component including a pillar extending through said hole of said sleeving wall and positioned in one of said positioning hole portions of said adjusting hole, said pillar being moveable through said reduced hole portion of said adjusting hole so as to be disposed in the other one of said positioning hole portions.

7. The eyeglasses as claimed in claim 6, wherein:
said sleeving wall of said temple body has an outer wall formed with said hole, an inner wall opposing and spaced apart from said outer wall, and two side walls, each interconnecting said outer wall and said inner wall, said outer wall having an indentation communicating with said hole; and
said fixing component includes a positioning plate on which said pillar is disposed and which is received at least partially within said indentation.

8. The eyeglasses as claimed in claim 6, wherein:
said arm portion has an outer wall surface, and an inner wall surface opposite said outer wall surface and formed with a depression, said depression being defined by a lateral wall, and a bottom wall surrounding a periphery of said adjusting hole;
said pillar of said fixing component has a pillar body disposed in said adjusting hole, and an engaging portion disposed in said depression, said engaging portion having an engaging edge abutting against said bottom wall of said depression.

9. The eyeglasses as claimed in claim 8, wherein said pillar has a groove extending through said pillar body and said engaging portion.

10. The eyeglasses as claimed in claim 9, wherein:
said sleeving wall of said temple body has an outer wall formed with said hole, an inner wall opposing and spaced apart from said outer wall, and two side walls, each interconnecting said outer wall and said inner wall, said outer wall having an indentation communicating with said hole; and
said fixing component includes a positioning plate on which said pillar is disposed and which is received at least partially within said indentation.

* * * * *